United States Patent

Sugiyama

[11] Patent Number: 5,950,494
[45] Date of Patent: Sep. 14, 1999

[54] STEERING WHEEL

[75] Inventor: Tomokazu Sugiyama, Fuji, Japan

[73] Assignee: Nihon Plast Co., Ltd., Japan

[21] Appl. No.: 08/937,677

[22] Filed: Sep. 25, 1997

[30] Foreign Application Priority Data

Sep. 27, 1996 [JP] Japan .................................. 8-256705
Mar. 26, 1997 [JP] Japan .................................. 9-073802

[51] Int. Cl.$^6$ ........................ G05G 11/00; H01H 29/16
[52] U.S. Cl. ...................... 74/484 H; 74/552; 200/61.55
[58] Field of Search ................. 74/484 H, 552; 200/61.54, 61.55

[56] References Cited

U.S. PATENT DOCUMENTS

| | | | |
|---|---|---|---|
| 2,708,695 | 5/1955 | Gibbs | 200/61.55 |
| 4,374,310 | 2/1983 | Kato et al. | 200/61.55 X |
| 4,808,776 | 2/1989 | Niwa et al. | 200/61.55 |
| 5,239,147 | 8/1993 | Allard et al. | 200/61.55 X |
| 5,410,114 | 4/1995 | Furuie et al. | 200/61.55 |
| 5,508,482 | 4/1996 | Martin et al. | 200/61.55 |
| 5,597,177 | 1/1997 | Matsuura | 200/61.55 X |

*Primary Examiner*—John A. Jeffery
*Assistant Examiner*—Marcus Charles
*Attorney, Agent, or Firm*—Jones & Askew

[57] ABSTRACT

A steering wheel assembly includes a pair of guide receiving portions that are integrally formed in both sides of a boss plate. A horn plate is integrally formed as a frame shape and is integrally provided with a pair of guide portions projecting from both sides of an upper side. Each of the guide portions is engaged with each of the guide receiving portions through an insulating upper side spacer to be supported to move in a vertical direction. A lower side portion of the horn plate is supported by a stepped bolt through an insulating lower side spacer in such a manner as to move in a vertical direction.

9 Claims, 10 Drawing Sheets

STEERING WHEEL

BACKGROUND OF THE INVENTION

1. Field of the Invention

The present invention relates to a steering wheel provided with a horn switch.

2. Description of the Related Art

A conventional steering wheel is described, for example, in Japanese Utility Model Publication No. 5-11748. The steering wheel is provided with a horn switch mechanism in a side of a steering wheel body close to the occupant and supports an air bag apparatus through the horn switch mechanism. Further the horn switch mechanism includes a fixed contact provided in a side close to the steering wheel body and a pair of horn plates having a movable contact provided in such a manner as to oppose the fixed contact. Each of the horn plates is mounted to the steering wheel body by a pair of bolts or screws and spring bodies in such a manner as to resiliently move forward and backward. The steering wheel is structured such that the movable contact is brought into contact with the fixed contact by pressing the air bag apparatus so as to close the horn switch, thereby sounding the horn.

In the structure of the related art, however, since the horn switch mechanism has a plurality of horn plates, a large number of bolts for mounting these horn plates and the like are needed. The number of parts is high and a complex assembling operation is required, making it difficult to reduce the manufacturing cost.

Further, the structure described in Japanese Patent Application Laid-Open No. 8-207780 is known. In this structure, a bridge is an engaging member for connecting core metals of a spoke portion of a steering wheel body to each other which presses a bracket for supporting a pad and has a pin projecting from the bridge and inserted into a hole formed in the bracket so as to position the bracket.

In the structure described in the latter disclosure, however, manufacturing costs are too high. The bridge for connecting the core metals of the spoke to each other, with the pin projecting from the bridge position, must support the bracket. Further, the pad body air bag apparatus is supported by the bridge. In order to securely fix the pad body, it is necessary to improve the strength of a member constituting the bridge so that there is a problem in trying to reduce the manufacturing cost.

SUMMARY OF THE INVENTION

The present invention has been achieved with such points in mind and overcomes the mentioned problems. It therefore is an object of the present invention to produce a steering wheel with a switch mechanism while also reducing the manufacturing cost. To achieve the object, according to a first aspect of the present invention, a steering wheel, comprises: a steering wheel body; a fixed contact provided in the steering wheel body; a horn plate provided with a body portion having a movable contact engaging and disengaging with the fixed contact; a biasing member for biasing the horn plate in a first direction where the movable contact is apart from the fixed contact; a guide receiving portion provided in the steering wheel body, the guide receiving portion engaging with the horn plate for guiding the horn plate to move forward and backward in the first direction and for restricting a movable range of the horn plate; and an adhering member adhered to the steering wheel body, the adhering member engaging with the horn plate for guiding the horn plate to move forward and backward in the first direction and for restricting the movable range of the horn plate.

In this structure, when the horn plate is moved against an energizing force of the biasing member by pressing the horn plate so that the movable contact provided in the horn plate is brought into contact with the fixed contact, the switch is closed, thereby sounding the horn. The horn plate is guided in such a manner as to move forward and backward and the movable range is restricted by the guide receiving portion provided in the side close to the steering wheel body. The adhering member is adhered to the side close to the steering wheel body. In comparison with the case that only the adhering member is used, the number of parts can be reduced and the manufacturing steps are simplified so that the manufacturing cost can be easily reduced. Further the horn plate can be easily and securely supported compared with the structure in which the adhering member is not used.

According to a second aspect of the present invention, the guide receiving portion supports one end of the horn plate and the adhering member supports another end of the horn plate.

In this structure, the horn plate is easily and securely supported in both ends in such a manner as to move forward and rearward. One end is supported by the guide receiving portion and the other end is supported by the adhering member so that an assembling operation can be easily performed by a series of smooth operations.

According to a third aspect of the present invention, the guide receiving portion is provided with an opposing portion opposing to a lower side of a part of the horn plate.

In this structure, a load is applied to the lower side of the steering wheel and when the steering wheel body is deformed, the load can be transmitted to the other portions of the steering wheel body through the horn plate and the opposing portion so that the other portions of the steering wheel body can be deformed in the following manner, thereby easily improving the impact absorbing characteristics.

According to a fourth aspect of the present invention, the steering wheel body has a core metal and the guide receiving portion is integrally formed in the core metal. In this structure, the number of parts and the manufacturing cost are reduced, and the mounting accuracy of the horn plate is improved.

According to a fifth aspect of the present invention, the horn plate is integrally provided with an insulating member at a portion slidably contacting with the guide receiving portion and a portion slidably contacting with the adhering member. In this structure, the number of parts and the manufacturing cost are reduced, and insulation can be securely achieved.

According to a sixth aspect of the present invention, the horn plate is provided with a guide portion slidably engaging the guide receiving portion to guide in the first direction and is inserted into the guide receiving portion in a second direction perpendicular to the first direction at right angles. In this structure, the horn plate is easily and stably supported by the guide receiving portion in such a manner as to move forward and backward, and an assembling operation is easily performed by a series of smooth operations such as supporting the other end by the adhering member after inserting the one end into the guide receiving portion so as to be engaged and supported.

According to a seventh aspect of the present invention, the horn plate is integrally formed with the body portion and with the guide portion. In this structure, the number of parts and the manufacturing cost are reduced, and the rigidity of the horn plate and in turn the operating feeling of the switch also are improved.

The above and further objects and novel features of the present invention will more fully appear from the following detailed description when the same is read in conjunction with the accompanying drawings.

DETAILED DESCRIPTION OF THE PREFERRED EMBODIMENTS

Figure 1:
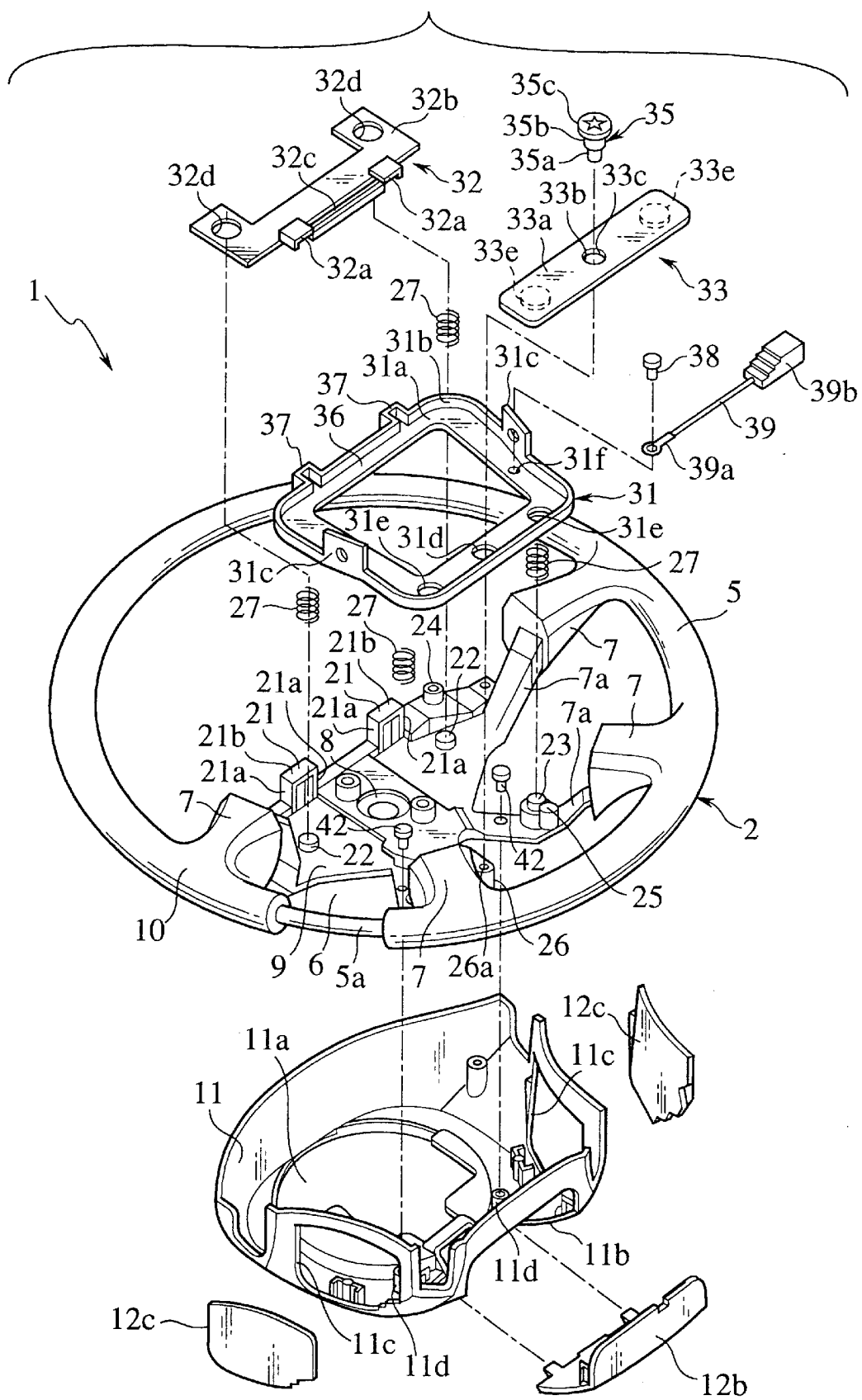
FIG. 1 is an exploded, perspective view which shows a first embodiment of a steering wheel in accordance with the present invention.
Figure 2:
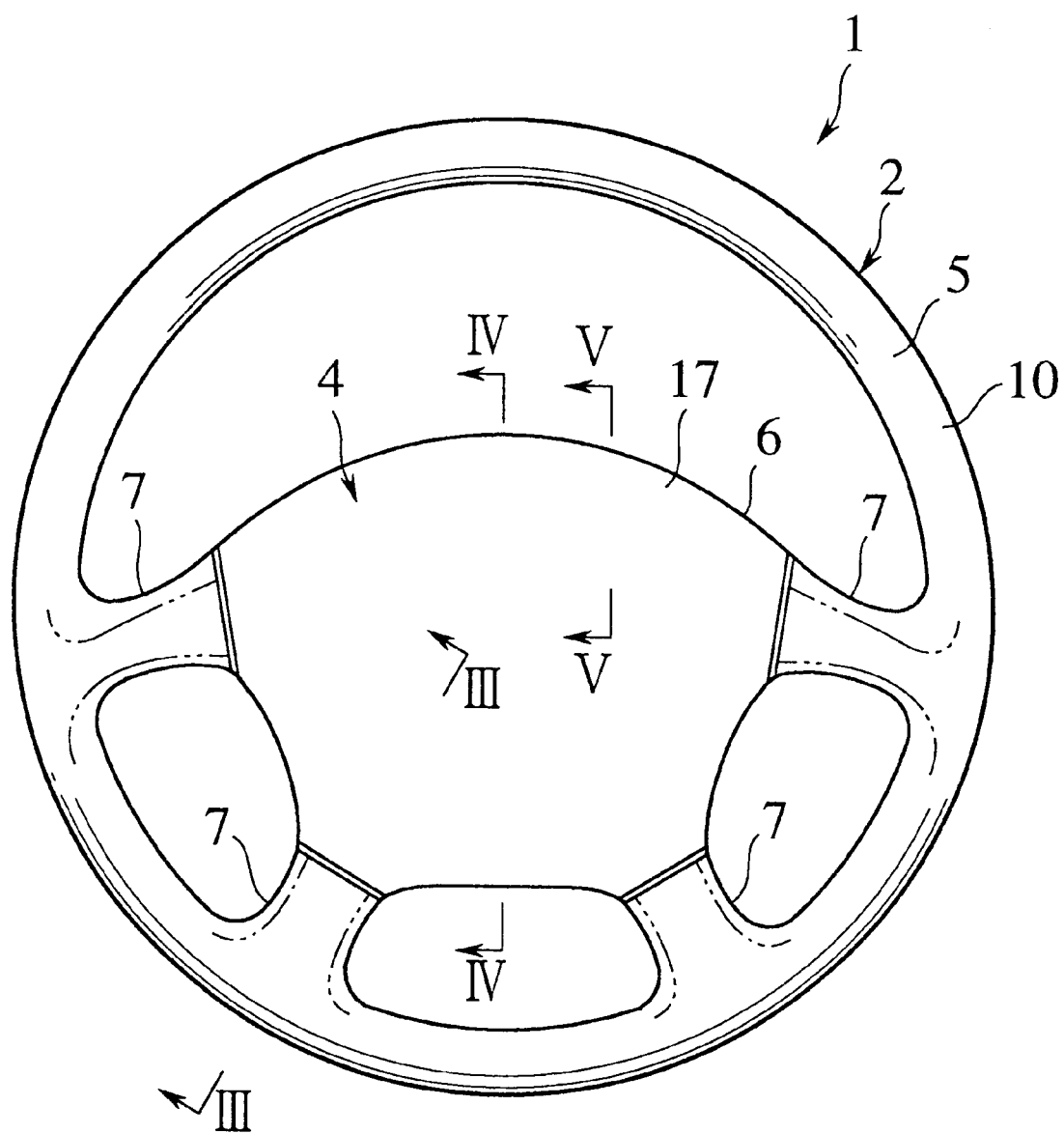
FIG. 2 is a plan view of the steering wheel shown in FIG. 1.

There will be detailed below the preferred embodiments of the present invention with reference to the accompanying drawings. Like members are designated by like reference characters.

In FIGS. 1 to 4, reference numeral 1 denotes a steering wheel of an automotive vehicle. The steering wheel 1 comprises a steering wheel body 2, an air bag apparatus or air bag module 4 mounted to a front portion corresponding to a portion close to an occupant of the steering wheel body 2 and serving as a pressing portion and the like. The steering wheel 1 is mounted to a steering shaft (not shown) which is normally provided in the vehicle in an inclined state.

In this specification the occupant side and its opposite side will be referenced. The side of the air bag apparatus 4 facing the occupant side being defined as the front side, the side facing the steering shaft which is opposite to the occupant side being defined as the rear side. Further reference will be made to two sides which are opposing each other and are perpendicular to the occupant side, one side which is toward the front windshield being defined as the upper side, the other side which is toward the back side of a vehicle as the lower side.

The steering wheel body 2 comprises a rim portion 5 having a circular ring shape, a boss portion 6 positioned inward of the rim portion 5 and a plurality of spoke portions 7 which connect the rim portion 5 and the boss portion 6. Further, in a rear portion which corresponds to a vehicle side of the boss portion 6, a boss 8 is formed by cutting a metal fitted to the steering shaft. A boss plate 9 constituting a core metal is integrally adhered to the boss 8 by an aluminum die casting or the like. A core metal 7a of the spoke portion 7 is integrally extended from the boss plate 9 or adhered to the boss plate by welding or the like. Further, a core metal 5a of the rim portion 5 is adhered to the core metal 7a of the spoke portion 7 by welding or the like. Still further, an outer layer portion 10 formed by a soft foam polyurethane or such is formed on the outer peripheral portion of the core metal 5a of the rim portion 5 and an outer peripheral portion of the rim portion side of the core metal 7a of the spoke portion 7.

A resin rear cover 11 is mounted to the boss portion 6 so as to cover the rear portion of the boss portion 6. The steering shaft is inserted into the rear cover 11 and a central opening portion 11a in which an electric connecting device such as a clock spring and the like for electrically connecting between the vehicle side and the steering wheel 1 side is disposed. A lower opening portion 11b is formed in the lower side portion of the rear cover 11 and side opening portions 11c are formed in both side portions of the rear cover 11. These opening portions 11b and 11c are respectively cover ed by cover members 12b and 12c in such a manner as to open and close. Further, a plurality of cylindrical mounting bosses 11d are integrally extended toward the front side from the front surface of the rear cover 11.

A horn switch mechanism is provided in the steering wheel body 2 and the air bag apparatus is mounted through the horn switch mechanism.

Figure 3:
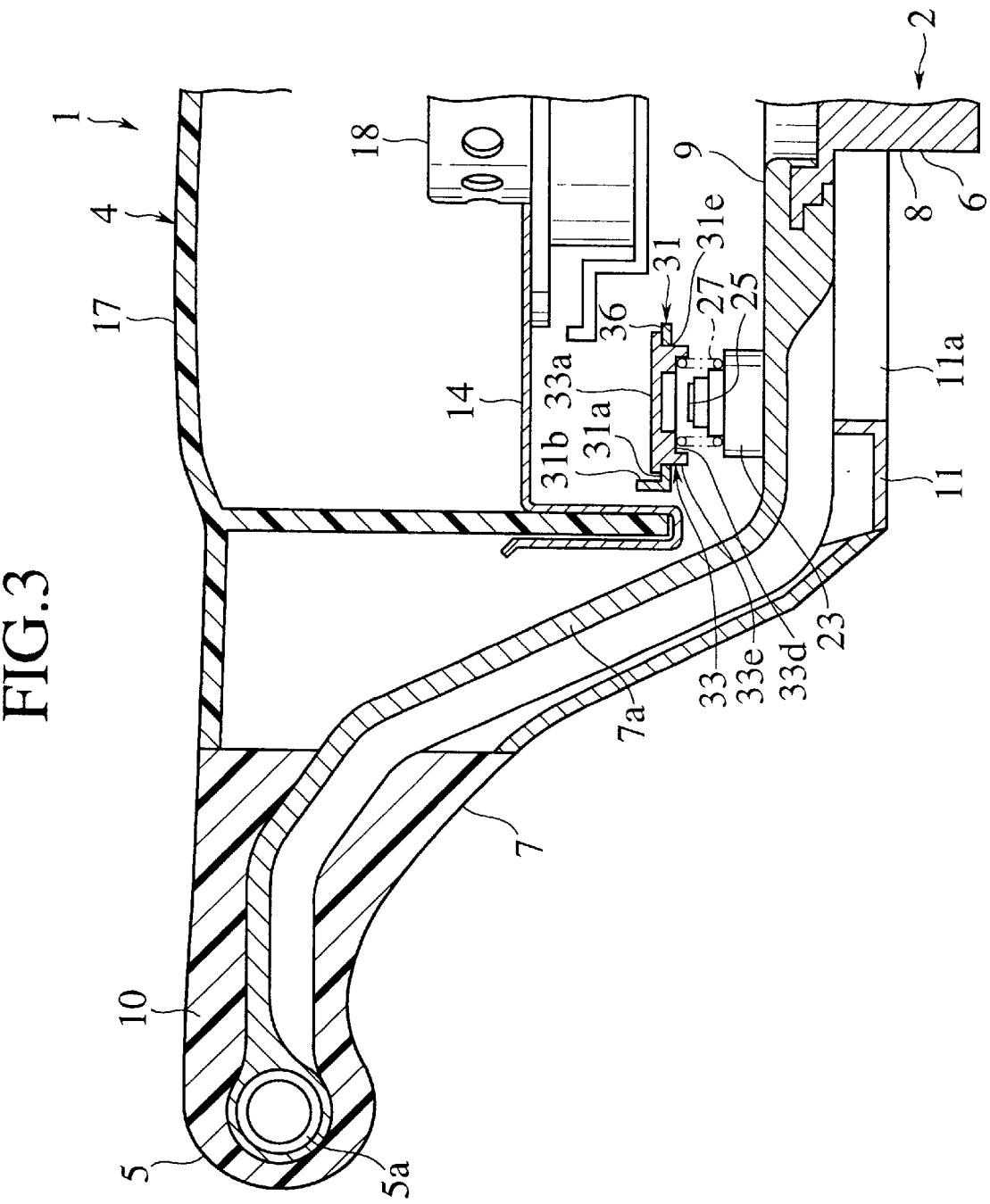
FIG. 3 is a cross sectional view taken along a line III—III in FIG. 2 of the steering wheel.
Figure 4:
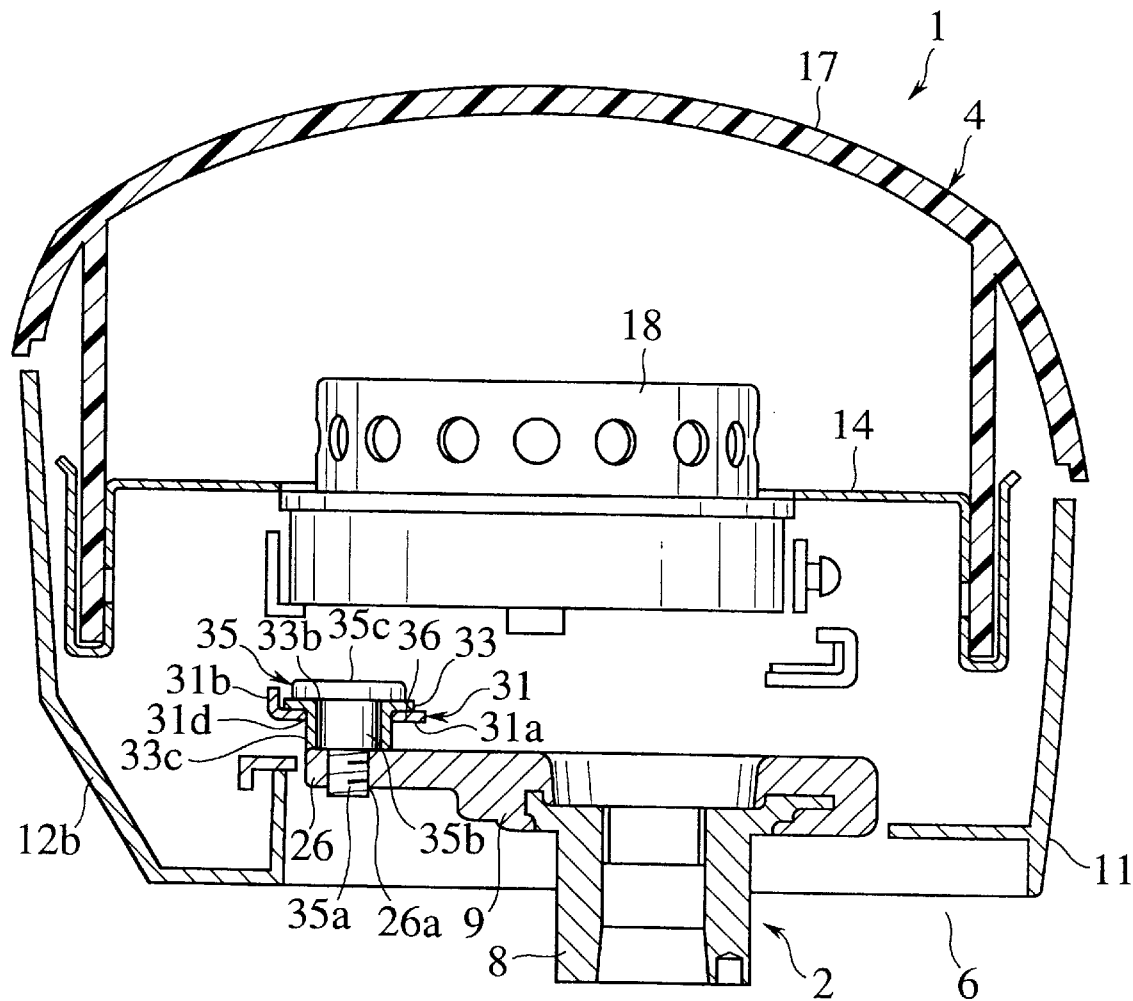
FIG. 4 is a cross sectional view taken along a line IV—IV in FIG. 2 of the steering wheel.
Figure 5:
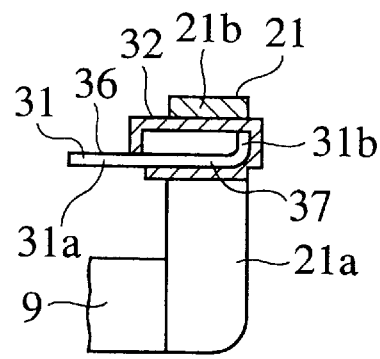
FIG. 5 is a partially cross sectional view taken along a line V—V in FIG. 2 of the steering wheel.
Figure 6:
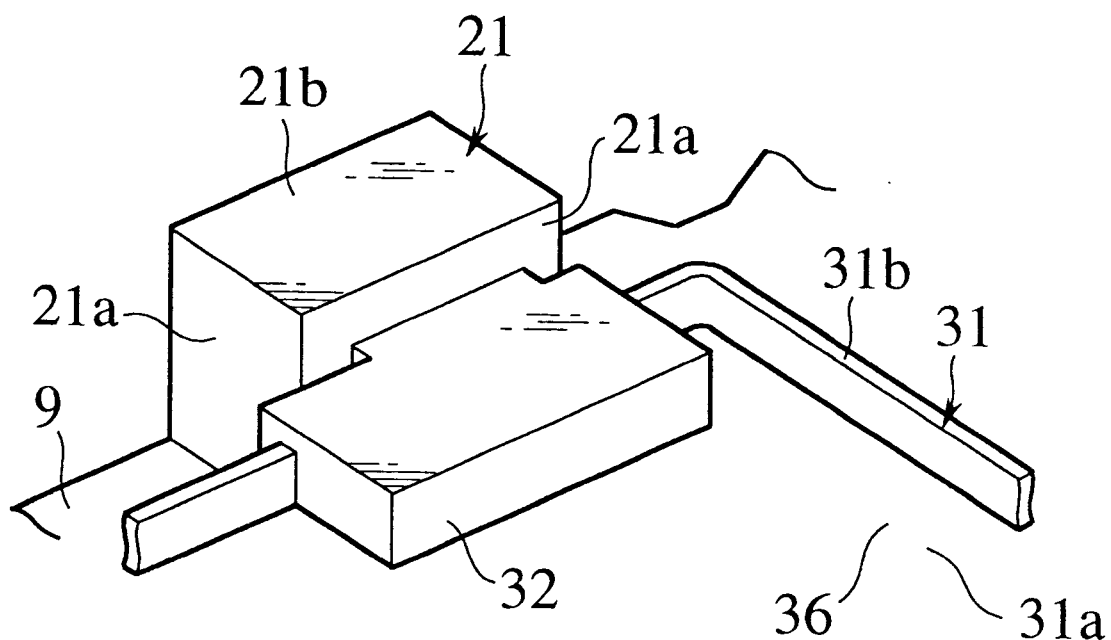
FIG. 6 is a partially perspective view of the steering wheel shown in FIG. 1.

The air bag apparatus 4 is provided with a base plate 14 preferably comprising a metal plate, as shown in FIGS. 3 and 4. The base plate 14 is structured such that a bag like air bag (not shown) and a resin cover member 17 are mounted from the front side of the base plate 14. An inflator 18 for injecting a gas or the like is mounted from the rear side of the base plate 14. Further, a pair of mounting portions (not shown) with nuts or the like are formed on both sides of the base plate 14.

In the event of a collision, an inert gas such as a nitrogen gas is rapidly injected into an inner portion of the air bag from the inflator 18 so that the folded and housed air bag is rapidly expanded. Then, the cover member 17 is broken by an expansion pressure of the air bag so as to form an outlet port having a predetermined shape for projecting the air bag, the air bag projects from the outlet port so as to expand and develop in front of the occupant, thereby protecting the occupant.

Still further, the horn switch mechanism comprises a member provided in the side of the steering wheel body 2 and a member provided in the side of the air bag apparatus 4. As shown in FIGS. 1 and 3 to 6, the member provided in the side of the steering wheel body 2 comprises a pair of guide receiving portions 21, a pair of upper spring receiving portions 22, a pair of lower spring receiving portions 23, a pair of upper fixed contacts 24 serving as a fixed contact, a pair of lower fixed contacts 25 serving as a fixed contact which are respectively provided in both sides, and a fixing portion 26.

Each of the guide receiving portions 21 is integrally formed in an upper end portion of the boss plate 9 by a casting with a conductive metal, for example, an aluminum die casting. Each guide receiving portion 21 is formed such as to have an inverted C shaped cross section which includes a pair of side plate portions 21a provided in both sides and a front plate portion 21b connecting front end portions of the side plate portions 21a to each other so as to have an opening in an upper and lower direction.

Further, each of the upper spring receiving portions 22 is integrally formed in the boss plate 9. Each of the lower spring receiving portions 23 is integrally formed in the core metal 7a of each of the rear spoke portions 7. The upper spring receiving portion 22 is formed as a cylindrical shape and the lower spring receiving portion 23 is formed as a cylindrical shape having a step portion in a middle portion and a front portion of a reduced diameter. Each of the upper spring receiving portions 22 and the lower spring receiving portions 23 support a rear side portion of a coil spring 27 of a resilient body serving as a biasing member.

The upper fixed contact 24 is disposed adjacent to each of the guide receiving portions 21 and the lower fixed contact 25 is disposed adjacent to each of the lower spring receiving portions 23, each of which is formed by inserting a conductive member or is integrally formed in the boss plate 9.

Furthermore, the fixing portion 26 is integrally provided in a projecting manner in the lower portion of the boss plate 9 and is provided with a screw hole 26a extending through in a vertical direction.

The member provided in the side of the air bag apparatus 4 of the horn mechanism comprises a horn plate 31 also serving as the movable contact. An upper spacer 32 serves as an insulating member. A lower spacer 33 serves as an insulating member. A stepped bolt 35 serves as an adhering member.

The horn plate 31 is integrally formed by piercing and bending a metal plate. The horn plate 31 is integrally provided with a plain plate portion 31a having a substantially rectangular frame plain surface. A cylindrical flange portion 31b projects upwardly (toward the front side) along an outer peripheral edge portion of the plain plate portion 31a. Mounting member portions 31c project upwardly (toward the front side) from the middle portion of the flange portion 31b disposed on both sides of a body portion 36. A pair of guide portions 37 project from the upper side portion which corresponds to an end side as one side of the body portion 36. Further, a lower side portion, which corresponds to the other end as the other side of the body portion 36, is provided with a circular mounting hole 31d in a center portion. A pair of holding holes 31e are disposed on both sides of the mounting hole 31d. Still further, the one side portion of the body portion 36 is provided with a screw hole 31f. A press-connecting terminal 39a of a horn code 39 is electrically and mechanically connected to the horn plate 31 by a screw 38 that engages the screw hole 31f.

The upper spacer 32 is integrally formed by a synthetic resin having an insulating characteristic. A pair of guide insulating portions 32a cover the respective guide portions 37 and fit generally onto the front portion. A rear insulating portion 32b contacts the rear surface of the horn plate 31. The upper spacer 32 is connected through a hinge portion 32c which is formed as a thin plate so as to be bent. Further, the rear insulating portion 32b is provided with a pair of upper spring receiving recess portions 32d in both sides thereof, each of which supports the front portion of the coil spring 27.

The lower spacer 33 is integrally formed by a synthetic resin having an insulating characteristic and includes a substantially rectangular plate-like base plate 33a. A generally circular through hole 33b is formed on the central portion of the base plate portion 33a and a cylindrical cylinder portion 33c which is fitted to the mounting hole 31d of the horn plate 31 from the above is integrally provided in a projecting manner. Further, two cylinder portions 33e, having a lower spring receiving recess portion 33d open to the below, are provided on the rear surface close to both end portions of the base plate portion 33a. Each cylinder portion 33e is structured such as to be fitted to the holding hole 31e of the horn plate 31 so as to project downward so that the front portion of the coil spring 27 can be mounted to the lower spring receiving recess portion 33d.

The stepped bolt 35 comprises a screw portion 35a engaging with the screw hole 26a of the fixing portion 26. A cylindrical middle portion 35b continuously connects to a front portion of the screw portion 35a and has a diameter greater than that of the screw portion 35a. A head portion 35c continuously connects to a front portion of the middle portion 35b and has a diameter greater than that of the middle portion 35b.

In assembling the horn switch mechanism, the coil spring 27 is mounted to the front and lower spring receiving portions 22 and 23. The front and lower spacers 32 and 33 then are mounted to the horn plate 31. At first each of the guide portions 37 are covered with the guide insulating portion 32a of the upper spacer 32 and inserted into each of the guide receiving portions 21 of the boss plate 9 toward the upper side and fitted in such a manner as to freely slide in a vertical direction so as to be positioned. Next, the stepped bolt 35 is inserted into the cylindrical portion 33c of the lower spacer 33, fitted to the mounting hole 31d of the horn plate 31 from the above so that the middle portion 35b is fitted in such a manner as to freely slide in a vertical direction and the screw portion 35a is engaged with the screw hole 26a of the fixing portion 26 so as to be fixed. In this state, the horn plate 31 is in a state of being insulated from the boss plate 9 and is guided at three portions of the guide receiving portions 21 and the stepped bolt 35 so as to be supported in such a manner as to resiliently move forward and backward in a vertical direction.

A mounting portion of the base plate 14 of the air bag apparatus 4 is fastened to the mounting member portions 31c of the horn plate 31 by bolts (not shown), whereby the air bag apparatus 4 can be fixed to the horn plate 31. The rear cover 11 is fixed to the boss plate 9 by a screw 42 engaging with the mounting boss 11d.

In the steering wheel 1 as assembled in the above manner, in a state where no force is applied to the air bag apparatus 4, the horn plate 31 supporting the air bag apparatus 4 is lifted up to a position in which the horn plate 31 is in contact with the guide receiving portion 21 and the head portion 35c of the stepped bolt 35 by a biasing force of the coil spring 27 so that the horn plate 31 is supported in a state where the horn plate 31 is apart from the fixed contacts 24 and 25.

When the horn plate 31 is pushed down to contact any of the fixed contacts 24 and 25 in a state where the air bag apparatus 24 is pressed and moved, the circuit of the horn switch mechanism is closed in the order of the steering shaft, the boss 8, the boss plate 9, the fixed contacts 24 and 25, the plain plate portion 31a of the horn plate 31, the horn cord 39, the connection device and the horn device of the vehicle side so that the horn can be sounded.

In accordance with the steering wheel 1 of the present invention, the guide portions 37 are integrally provided in the front end side of the horn plate 31 in a projecting manner and engaged with and supported to the guide receiving portions 21 integrally provided in the boss plate 9 in substantially an inverted C manner. The lower end side of the horn plate 31 is supported by the stepped bolt 35 screwed and fixed to the boss plate 9 so that the horn plate 31 can be guided stably without shaking in such a manner as to move forward and backward in a vertical direction and so that a movable range to the upward of the horn plate 31 can be restricted. Accordingly, in comparison with the structure in which a plurality of horn plates are respectively supported by a plurality of bolts, a number of parts such as bolts or screws is reduced and manufacture is simplified so that the manufacturing cost is reduced. In comparison with the structure in which the horn plate is supported only by an engagement, the horn plate is easily and securely supported so that the horn switch mechanism, which is suitable for the air bag apparatus 4 and the like, can be structured.

The guide receiving portions 21 are integrally formed in the boss plate 9 constituting the core metal by die casting so that the horn plate 31 is supported with a low cost and a good mounting accuracy.

Since the horn plate 31 is integrally formed as a frame shape, and the number of parts is reduced, the rigidity of the horn plate 31 is easily improved and the dimensional accuracy is improved so that an operation feeling of the switch is improved.

In the above embodiment, although the guide portion 37 of the horn plate 31 is structured such as to be projected toward the upper side from the upper end portion of the body portion 36 and the guide receiving portion 21 of the steering wheel body 2 is structured such as to be formed as an inverted C shape which is open upper and lower, the guide portion and the guide receiving portion can employ various kinds of shapes or the structure can be made such that the guide receiving portion is engaged with the frame like body portion and the projecting guide portion is not formed. Further, the front and lower spacers 32 and 33, serving as an insulating member, can also employ various kinds of shapes. The spacers can be independently formed so as to be mounted to the horn plate 31 or can be integrally formed in the horn plate 31 by a molding process, for example.

In the following description, the same reference numeral is attached to the same structure and the explanation thereof is omitted.

Figure 7:
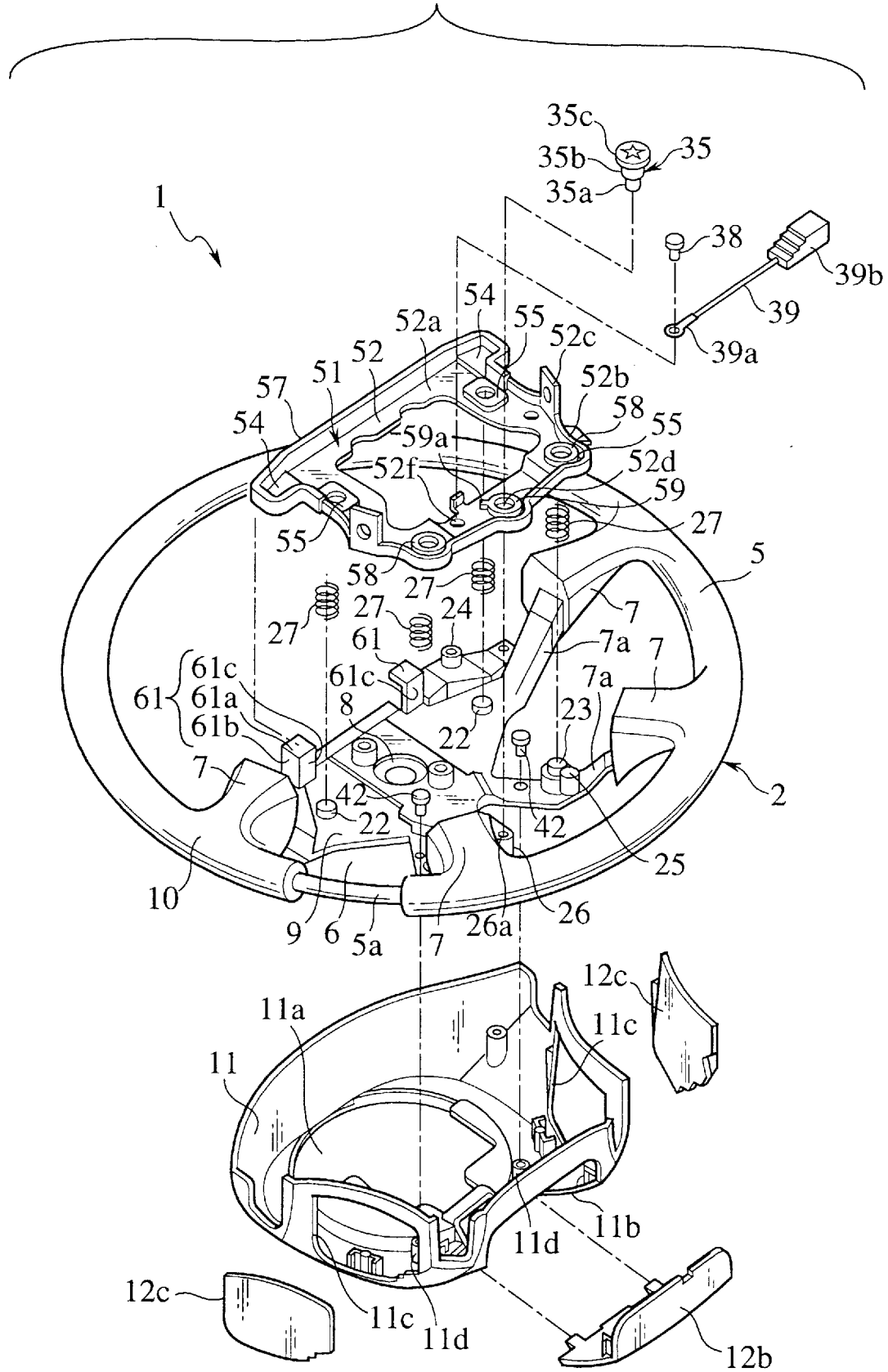
FIG. 7 is an exploded perspective view which shows a second embodiment of a steering wheel in accordance with the present invention.
Figure 8:
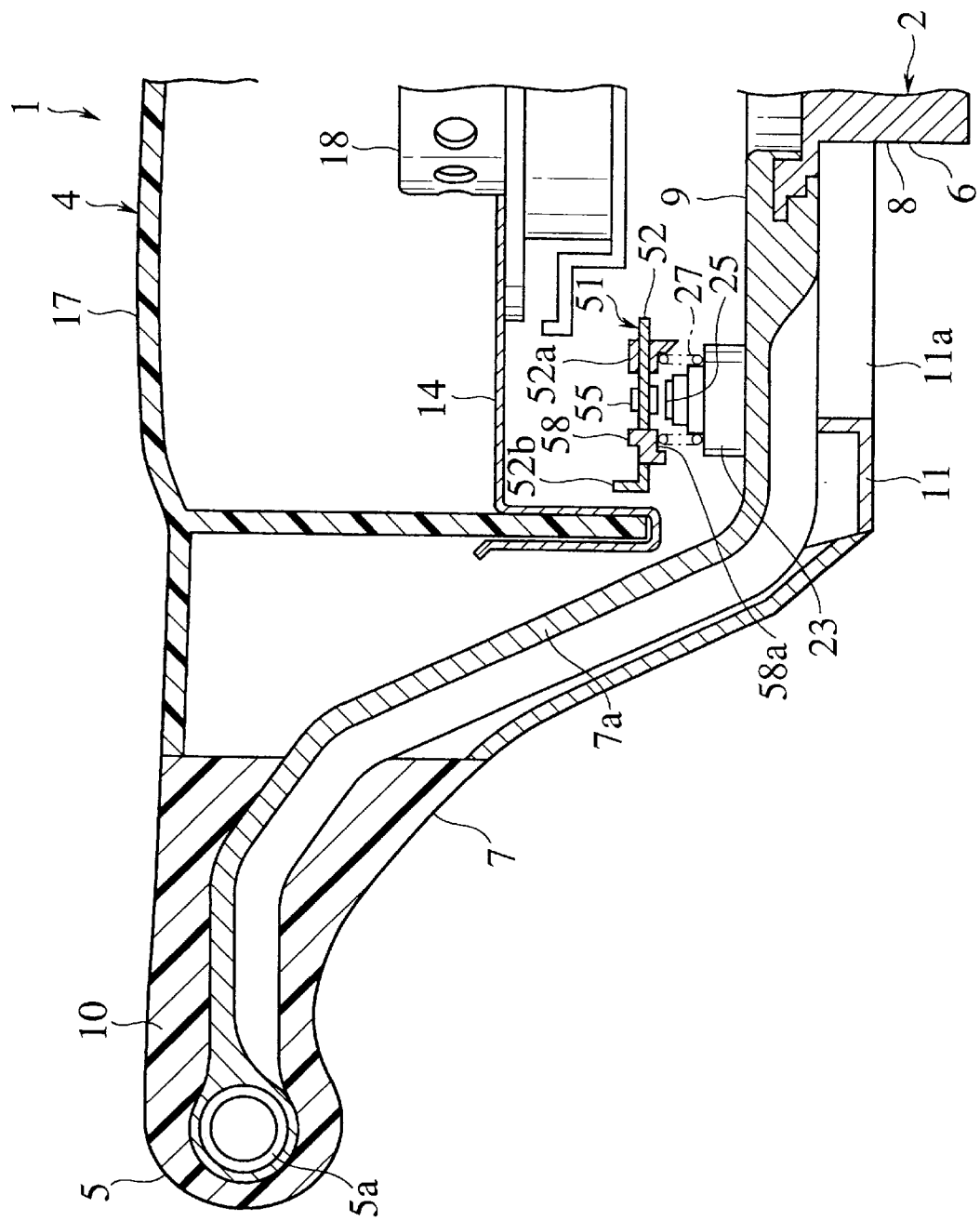
FIG. 8 is a cross sectional view of a position corresponding to III—III in FIG. 2 of the steering wheel shown in FIG. 7.
Figure 9:
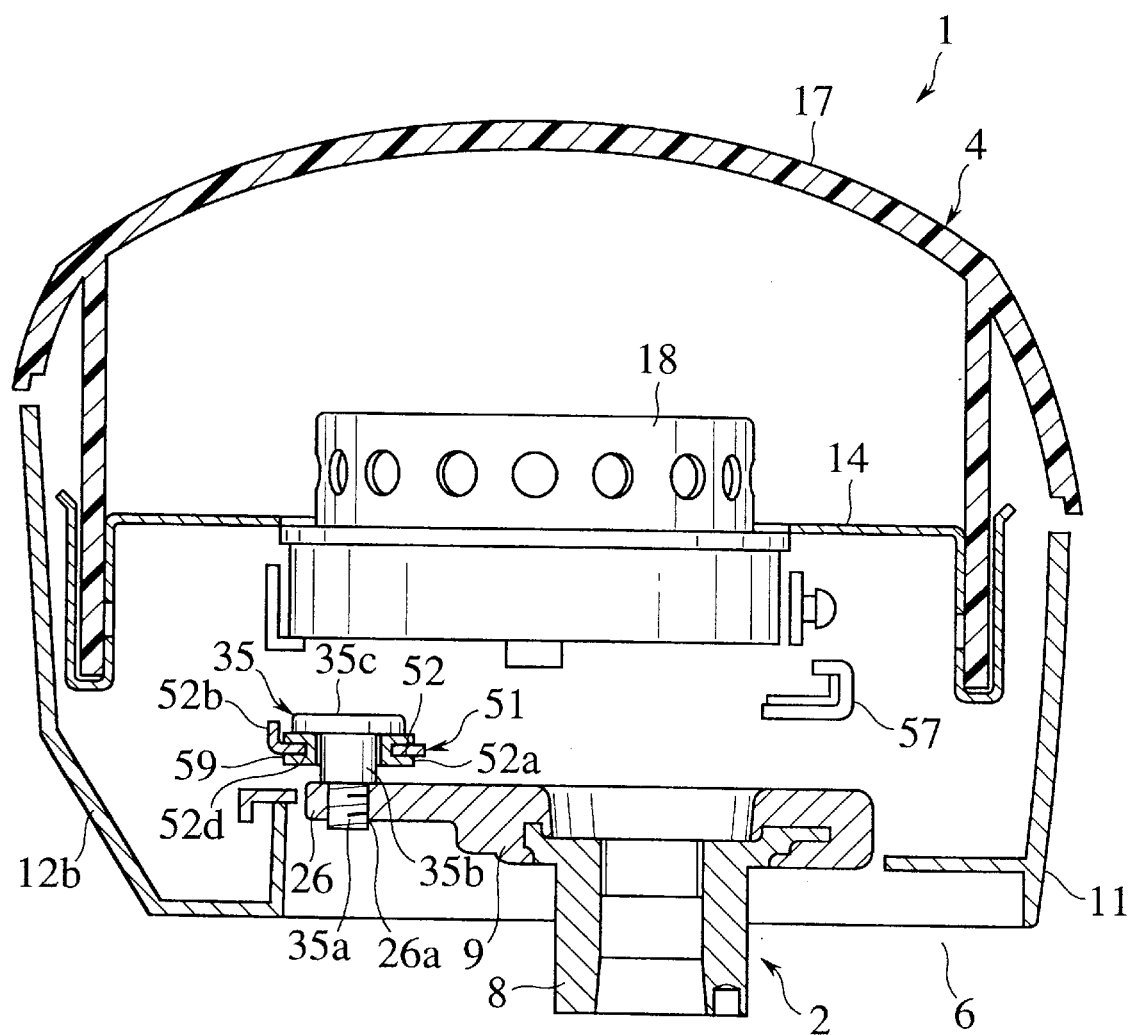
FIG. 9 is a cross sectional view of a position corresponding to IV—IV in FIG. 2 of the steering wheel shown in FIG. 7.

As a second embodiment shown in FIGS. 7 to 9, a horn plate 51 is formed by piercing and bending the metal plate so as to integrally form a frame like body portion 52 and a pair of guide portions 54 which are provided in such a manner as to project from the upper side portion as an end of the body portion 52 toward both sides. The body portion 52 is integrally provided with a frame like plain plate portion 52a, a cylindrical flange portion 52b projected upward along an outer peripheral edge portion of the plain plate portion 52a. Mounting member portions 52c project upward from a middle portion of the flange portions 52b positioned in both sides. A lower portion as another end of the body portion 52 has a center portion formed to be a step lower than the other portions and has a circular mounting hole 52d. In addition to this, the lower portion is provided with a screw hole 52f near the mounting hole 52d and the press-connecting terminal 39a of the horn cord 39 is electrically and mechanically connected to the horn plate 51 by the screw 38 engaging the screw hole 52f. Near the four corners of the body portion 52, an independent movable contact 55 is fixed preferably by insertion and caulking and a single hole or a plurality of through holes are formed near the movable contact 55, respectively.

In place of the upper and lower spacers, an upper insulating portion 57, a lower insulating portion 58 and a central insulating portion 59 are integrally formed in such a manner as to cover the horn plate 51. These insulating portions 57, 58 and 59 are also called insulators for insulating and preferably are formed by so-called outset forming using an insulating synthetic resin in such a manner as to closely attached to the horn plate 51. The upper insulating portion 57 is integrally formed by continuously connecting the upper portion of the flange portion 52b of the body portion 52, both sides of the guide portions 54, and the portion surrounding the upper side movable contact 55. Further, the portion surrounding the upper side movable contact 55 has upper and rear portions connected to each other through the through hole of the horn plate 51 and a rear side portion in which a spring receiving recess portion, to which the front side portion of the coil spring 27 is attached in an insulating state, is formed. The lower insulating portion 58 is formed as an annular shape by surrounding the lower side movable contact 55 as shown in FIG. 8. Front and rear portions thereof are connected to each other through the through hole of the horn plate 51 and a rear side portion thereof is provided with a spring receiving recess portion 58a to which the front side portion of the coil spring 27 is attached in an insulating state. Further, the central insulating portion 59 covers the edge portion of the mounting hole 52d as shown in FIGS. 7 and 9, annually covers the upper and rear surface near the mounting hole 52d and further is provided with an extended portion 59a in the front surface side portion.

Guide receiving portions 61 are integrally formed in such a manner as to project upward from both side portions of the upper portion of the aluminum die casting boss plate 9 constituting the core metal. The guide receiving portions 61 comprise a horizontal front plate portion 61a, a perpendicular side plate portion 61b continuously connected to an outer side of the front plate portion 61a, and a perpendicular lower plate portion 61c corresponding to an opposing portion continuously connected to a lower side of the front plate portion 61a so as to form an inner side surface and an upper side surface both opened.

Then, in a state in which the coil spring 27 is attached to the upper and lower spring receiving portions 22 and 23 of the steering wheel body 2, the guide portion 54 of the horn plate 51 is slid from the upper side to the lower side (back side) so as to be engaged with the guide receiving portion 61. The stepped bolt 35 is inserted into the central insulating portion 59 which covers the mounting hole 52d so as to be engaged with and attached to the screw hole 26a of the steering wheel body 2 whereby the horn plate 51 can be mounted to the steering wheel body 2.

Accordingly, with the second embodiment, like the first embodiment, the horn plate 51 can be easily mounted to the steering wheel body 2 and can be smoothly moved forward and rearward without shaking in a horizontal direction. Further, in addition to the effect of the first embodiment, since the respective insulating portions 57, 58 and 59 are integrally formed in the horn plate 51, the number of parts is reduced and manufacturing is simplified so that the manufacturing cost is reduced. Still further, in the case that the load is applied to the near side of the steering wheel 1 and the steering wheel body 2 is deformed at a time of collision, the lower side (back side) of the horn plate 51 is deformed and the upper side is moved. However, since the guide portion 54 is engaged with the guide receiving portion 61 from the upper side and the lower side portion of the guide portion 54 is supported by the lower plate portion 61c, the load can be transmitted to tile other portions of the steering wheel body 2 through the horn plate 51 and the lower plate portion 61c and the other portions of the steering wheel body 2 can be plastically deformed in the following manner so that the impact absorbing characteristics can be easily improved.

Figure 10:
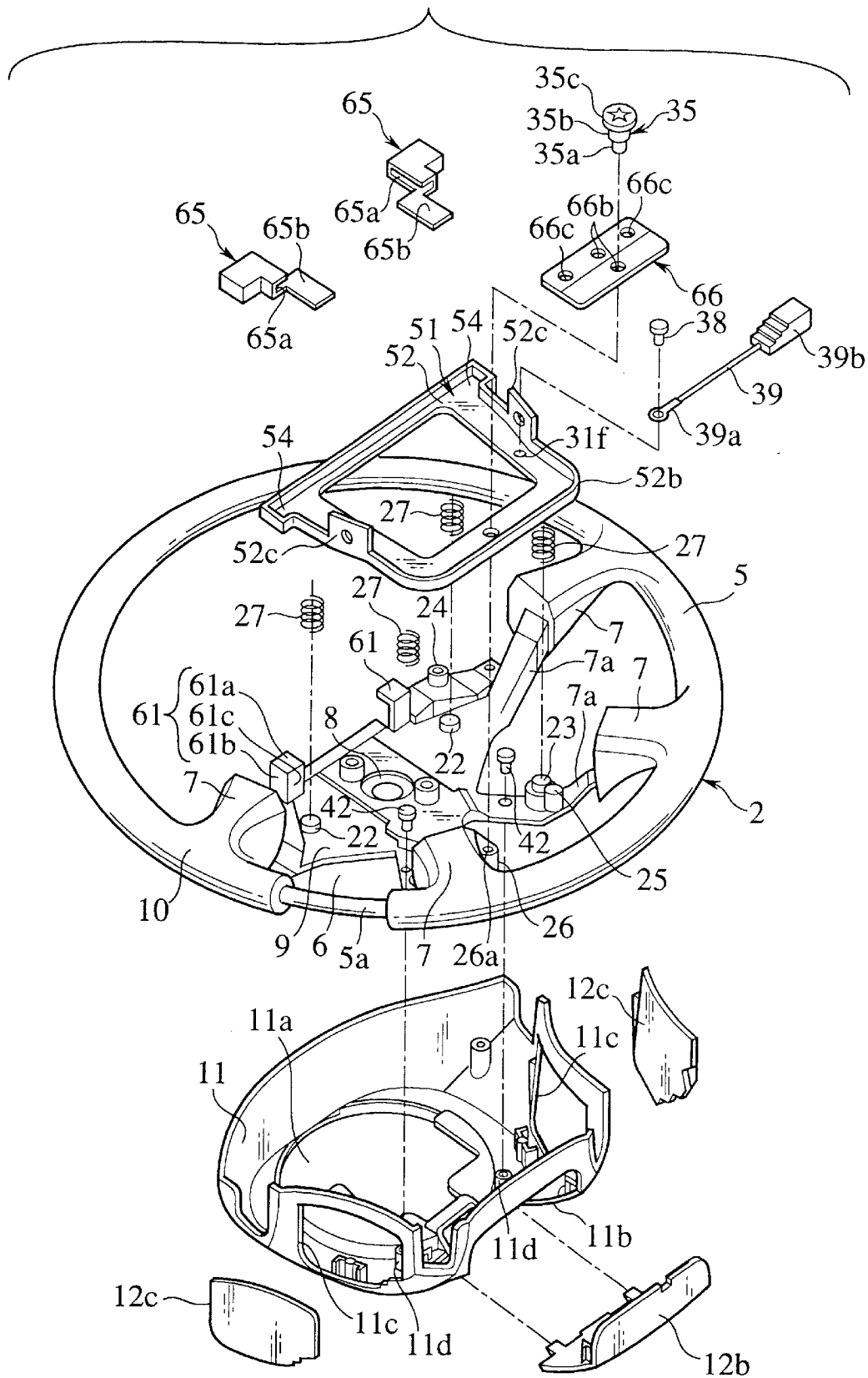
FIG. 10 is an exploded perspective view which shows a third embodiment of a steering wheel in accordance with the present invention.

Further, although the respective insulating portions 57, 58 and 59 are integrally formed in the horn plate 51 by an outset forming in the second embodiment, as in a third embodiment shown in FIG. 10, independent upper insulators 65 and a lower insulator 66 serving as an insulating member may be mounted to the horn plate 51. Then, a pair of upper insulators 65 are formed as a symmetrical shape with respect to each other and are provided with a mounting portion 65a fitted to and attached to the guide portion 54 projecting toward both sides and with a spring receiving recess portion 65b extending to the rear surface side of the body portion 52 of the horn plate 51 from the mounting portion 65a and to which the front side portion of the coil spring 27 is attached in an insulating state. Further, the lower insulator 66 is bent along a central bending line 66a so as to hold the body portion of the horn plate 51 therebetween and is integrally provided with a mounting hole 66b to which the stepped bolt 35 is inserted and a spring receiving recess portion 66c to which the front side portion of the coil spring 27 is attached in an insulating state.

Figure 11:
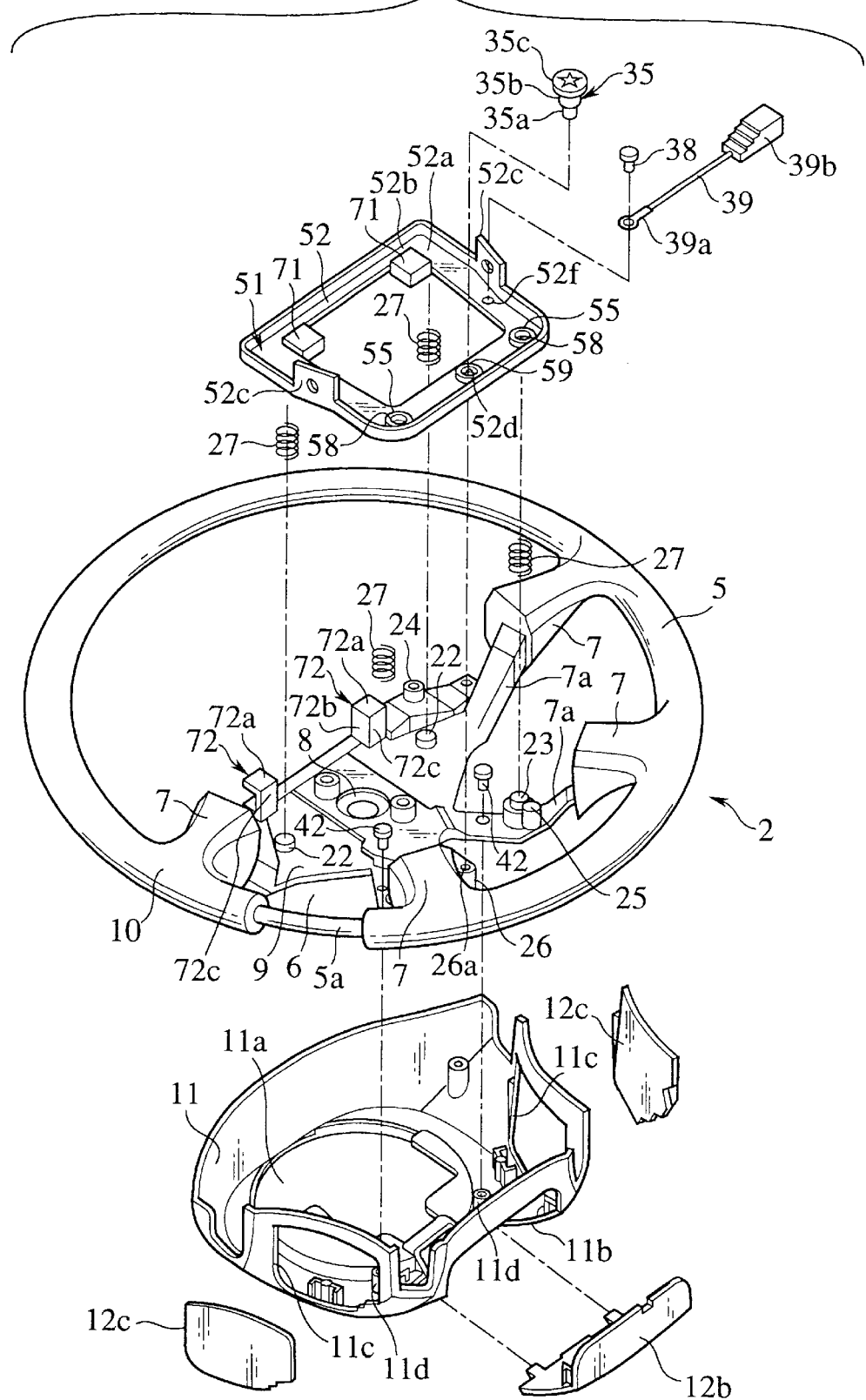
FIG. 11 is an exploded perspective view which shows a fourth embodiment of a steering wheel in accordance with the present invention.

Although the guide portion is provided in the outer side of the frame like body portion of the horn plate in each of the above embodiments, a guide portion with which the guide receiving portion is engaged may be formed in an inner side of the frame like body portion. For example, as a fourth embodiment shown in FIG. 11, guide portions 71 are respectively provided in the upper and inner side corner portion of the body portion 52 of the horn plate 51 in a projecting manner. Guide receiving portions 72 of the steering wheel body 2 are provided with a horizontal front plate portion 72a, a vertical side plate portion 72b continuously connected to the inner side of the front plate portion 72a and a vertical lower plate portion 72c as an opposing portion continuously connected to the lower side of the front plate portion 72a, which forms an outer side surface and an upper side surface in an open manner and is engaged with the guide portions 71 by inserting them from the upper side of the guide receiving portions 72. An insulating member for covering the guide portions 71 can be integrally formed by an insert forming or by combining independent members.

In the above respective embodiments, each of the guide receiving portions 21 is integrally formed in the boss plate 9, however, it may be independently formed by a resin and the like.

Further, the biasing member for supporting the horn plate 31 may be formed by a plate like spring or an elastic resin other than the coil spring 27. Still further, the fixed contact and the movable contact may be also integrally or independently formed in the boss plate 9 and the horn plate 31, respectively.

Furthermore, although the air bag apparatus 4 constitutes the pressing portion for the horn switch mechanism in each of the above embodiments, a pad member having an impact absorbing member therein may be used for the pressing portion.

While preferred embodiments of the present invention have been described using specific terms, such description is for illustrative purposes, and it is to be understood that changes and variations may be made without departing from the spirit or scope of the following claims.

What is claimed is:

1. A steering wheel, comprising:

a steering wheel body;

a fixed contact provided in the steering wheel body;

a horn plate provided with a body portion having a movable contact that selectively engages the fixed contact;

a biasing member for biasing the horn plate in a first direction where the movable contact is apart from the fixed contact;

a guide receiving portion provided in the steering wheel body, the guide receiving portion engaging with the horn plate for guiding the horn plate to move forward and backward in the first direction and for restricting a movable range of the horn plate;

an adhering member adhered to the steering wheel body, the adhering member engaging with the horn plate for guiding the horn plate to move forward and backward in the first direction and for restricting the movable range of the horn plate;

wherein the horn plate is formed with a guide portion protruding from one end of the horn plate in a second direction crossing with the first direction; and the guide portion is slidably engaged with the guide receiving portion for being guided in the first direction so that the horn plate is guided in the first direction.

2. The steering wheel according to claim 1, wherein the guide receiving portion supports one side of the horn plate and the adhering member supports the other side of the horn plate.

3. The steering wheel according to claim 1, wherein the guide receiving portion is provided with an opposing portion opposing to a lower side of a part of the horn plate.

4. The steering wheel according to claim 1, wherein the steering wheel body has a core metal and the guide receiving portion is integrally formed in the core metal.

5. The steering wheel according to claim 1, wherein the horn plate is integrally provided with an insulating member at a portion slidably contacting with the guide receiving portion and a portion slidably contacting with the adhering member.

6. The steering wheel according to claim 1, wherein the guide portion is protruding outwardly from the end of the horn plate; and the guide portion is inserted into the guide receiving portion in the second direction.

7. The steering wheel according to claim 6, wherein the horn plate is integrally formed with the body portion and with the guide portion.

8. The steering wheel according to claim 2, wherein the horn plate is integrally provided with an insulating member at a portion slidably contacting with the guide receiving portion and a portion slidably contacting with the adhering member.

9. The steering wheel according to claim 2, wherein the horn plate is provided with a guide portion slidably engaging with the guide receiving portion for being guided in the first direction and for being inserted into the guide receiving portion in a second direction crossing with the first direction.

* * * * *